No. 802,342. PATENTED OCT. 17, 1905.
P. A. WHITLEY.
FERTILIZER DISTRIBUTER.
APPLICATION FILED DEC. 13, 1904.
2 SHEETS—SHEET 1.
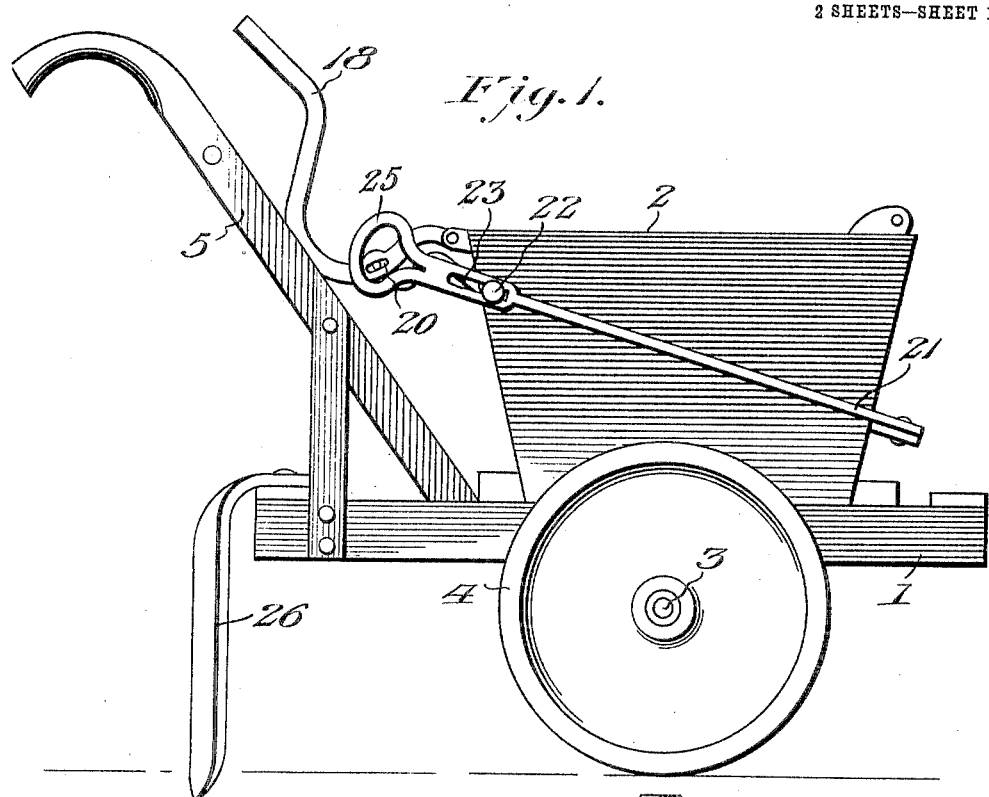
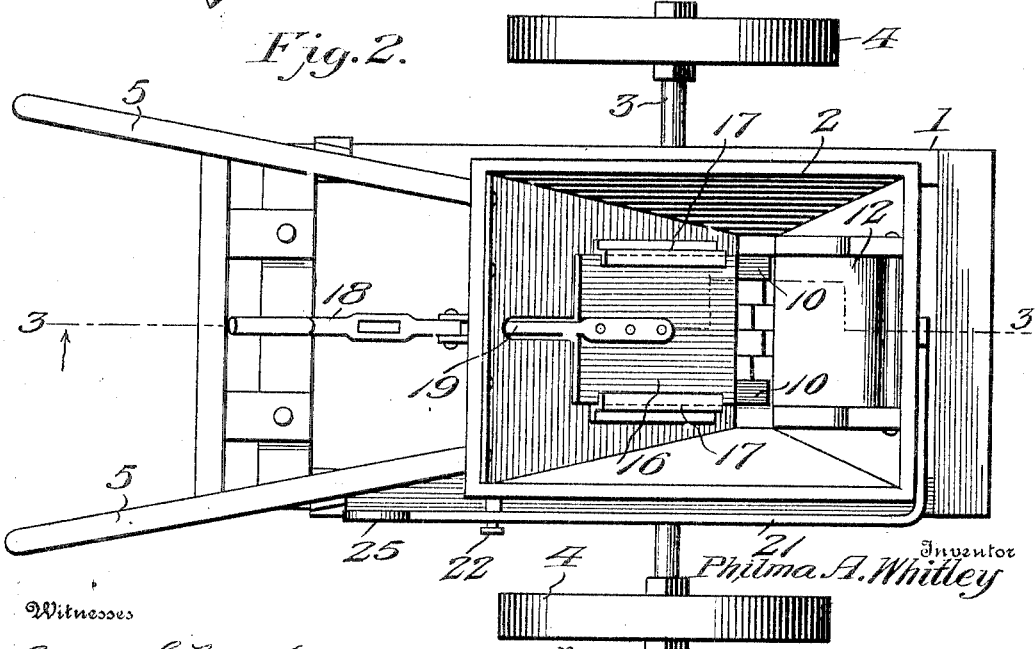

No. 802,342. PATENTED OCT. 17, 1905.
P. A. WHITLEY.
FERTILIZER DISTRIBUTER.
APPLICATION FILED DEC. 13, 1904.

2 SHEETS—SHEET 2.

Witnesses
Edwin G. McKee
John H. Byrne

Inventor
Philma A. Whitley
By Victor J. Evans
Attorney

UNITED STATES PATENT OFFICE.

PHILMA A. WHITLEY, OF SUN, NORTH CAROLINA.

FERTILIZER-DISTRIBUTER.

No. 802,342.      Specification of Letters Patent.      Patented Oct. 17, 1905.

Application filed December 13, 1904. Serial No. 236,715.

*To all whom it may concern:*

Be it known that I, PHILMA A. WHITLEY, a citizen of the United States, residing at Sun, in the county of Wilson and State of North Carolina, have invented new and useful Improvements in Fertilizer-Distributers, of which the following is a specification.

My invention relates to fertilizer-distributers; and its primary object is to provide a new and useful device of this character having a rotary feed-wheel composed of disks provided with peripheral teeth so relatively arranged as to provide pockets disposed alternately whereby quantities of fertilizer may be discharged in spaced and alternating rows, so as to most effectually distribute the same over the surface.

A further object of the invention is to provide a chute-board having its lower end disposed in adjustable relation to the feed-wheel, whereby the quantity of fertilizer to be distributed by each row of pockets may be regulated.

A further object of the invention is to provide a distributer with an agitator adapted to be vibrated by the feed-wheel, so as to agitate the fertilizer just prior to the presentation of each row of pockets in position to receive a supply of fertilizer, whereby equal quantities of fertilizer may be deposited.

With the above and other objects in view the invention consists in the construction, combination, and arrangement of parts, hereinafter fully described, claimed, and illustrated in the accompanying drawings, which disclose the preferred form of my invention, and in which—

Figure 3:
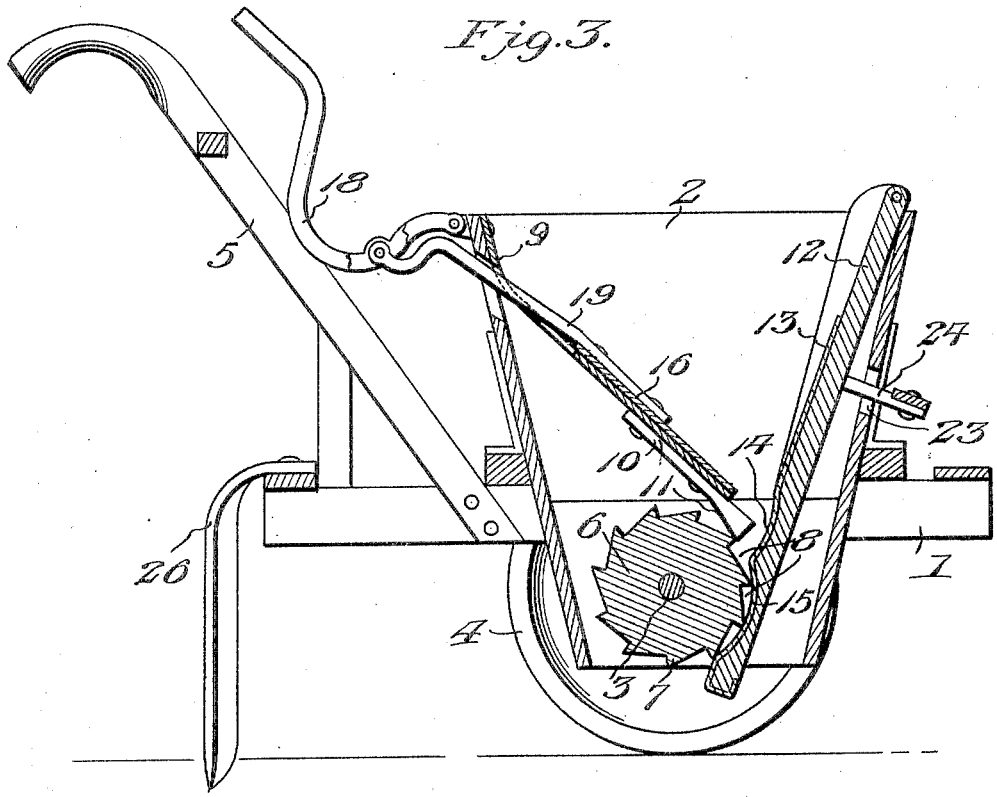
Figure 4:
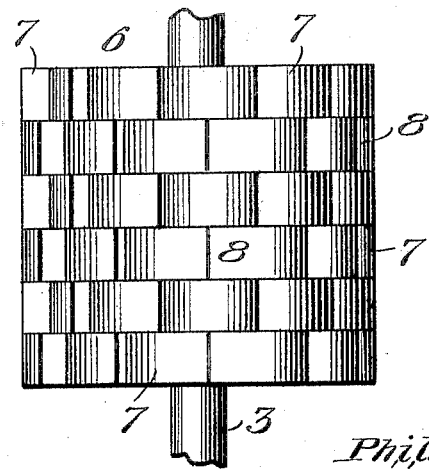

Figure 1 is a side elevation of a distributer constructed in accordance with my invention. Fig. 2 is a top plan view thereof. Fig. 3 is a sectional view on the line 3 3, Fig. 2; and Fig. 4 is a detail plan view of the rotary feed-wheel.

Referring to the drawings by reference-numerals, 1 designates the frame of the distributer having rigidly secured thereto a hopper 2, the lower end of which is fully open, as disclosed in Fig. 3 of the drawings. An axle 3 is journaled in the lower end of the hopper, and keyed thereto are supporting-wheels 4. Handles 5 are fixed to the frame 1 in the rear of the hopper 2. The frame, hopper, and handles are of the usual construction and form, and therefore a further extended description thereof is deemed unnecessary.

A feed-wheel 6 is keyed to the axle 3 to revolve therewith, and said wheel comprises a plurality of disks having peripheral teeth 7. The teeth of the disks are so relatively arranged as to provide alternating pockets 8. An agitator 9 in the form of a resilient plate is secured to the rear wall of the hopper near the upper end thereof, so as to dispose the lower free end of said agitator above the feed-wheel 6. Cam-rods 10 are secured to the under side of the agitator 9 to dispose their lower ends in advance of the lower edge of the agitator and to place them in contact with the teeth of the end disks of the feed-wheel 6. The lower ends of the rods 10 are provided with inclined faces 11 into engagement with which the teeth of the end disks are successively brought during the rotation of the feed-wheel to vibrate the agitator in a manner that is apparent. A chute-board 12 is hingedly connected at its upper end to the front wall of the hopper disposing its lower free end in parallel relation to the feed-wheel 6, the lower extreme end of said board 12 projecting below said feed-wheel. The inner face of the board 12 has secured thereto a wear and reinforce plate 13, which is provided with arcuate depressions 14 and 15. The space between the depression 14 and the lower end of the agitator 9 provides a feed-opening, and the feed through said opening is regulated by means of a slide 16. The upper face of the agitator is provided with cleats 17, providing ways in which is movably mounted the slide 16. A lever 18 is pivotally secured to the upper and rear end of the hopper 2, and a rod 19 connects said lever and slide 16. The means for connecting the rod 19 and lever 18 is mounted in slots 20 in the lever, the purpose of which is apparent, and said lever is so curved as to dispose its free end above the hopper in easy reach of the operator. The extremities of the teeth of the feed-wheel are adapted to be placed during the revolution of the feed-wheel in the depression 15, and the inner opposing faces of the feed-wheel and the depression provide the pockets 8, and said chute-board is adapted to be adjusted so as to increase or decrease the carrying capacity of said pockets. A lever 21 is slidably secured to the side of the hopper by means of a pin 22, carried by the hopper and passing through a slot 23 in the lever 21. The front end of said lever is curved inwardly toward the longitudinal center of the hopper and is secured to a stud 24, the latter being secured to the chute-board 12 and passing through an opening 24 in the front wall of the hopper. The rear end of the lever is provided with a handle 25, by means of which the lever may be operated to turn the chute-board upon its pivot to increase or decrease the carrying capacity of the pockets 8.

Secured to the rear end of the frame 1 are blades 26, adapted to engage the soil so as to thoroughly intermingle the deposited fertilizer therewith.

It is apparent from the above description, taken in connection with the accompanying drawings, that the agitator will be vibrated simultaneously with the presentation of each row of pockets to the feed-opening, thereby insuring a sufficient feed to permit of each pocket being filled to its utmost capacity. A further advancement of the pockets will carry them into the depression 15, and a still further advancement will deposit the fertilizer upon the soil. The wear and reinforcing plate 13 is provided with an offset intermediate the depressions 14 and 15, so as to direct the fertilizer into the pockets, as is apparent from Fig. 3 of the drawings. It is further apparent that the chute-board may be so adjusted as to regulate the quantity each pocket is adapted to deposit and that the sides of the feed-opening may be regulated by the adjustment of the slide 16.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus fully described the invention, what is claimed as new is—

1. In a fertilizer-distributer, a hopper having an opening in the top thereof, a pocketed feed-wheel, means for rotating the wheel, a pivotally-mounted chute-board for regulating the quantity of fertilizer to be distributed by each pocket, an adjusting-lever slidably mounted upon one side of the hopper and having an arm extending in front of the hopper, and a connection between the said arm and chute-board extending through the opening in the hopper.

2. In a fertilizer-distributer, a hopper, a feed-wheel having teeth forming pockets, means for rotating the wheel, an adjustable chute-board coöperating with the feed-wheel, and a vibratory agitator provided with cam-rods engaging the teeth of the feed-wheel.

3. In a fertilizer-distributer, a hopper, a pocketed feed-wheel, an adjustable chute-board adapted to regulate the amount of fertilizer to be distributed by each pocket, an agitator vibrated by the feed-wheel, and a slide carried by the agitator.

4. In a fertilizer-distributer, a frame, a chute, an axle, wheels mounted on the axle, a feed-wheel keyed to the axle to rotate therewith and comprising disks provided with peripheral teeth forming alternating pockets, an adjustable chute-board adapted to regulate the amount of fertilizer to be distributed by each pocket, an agitator vibrated by the feed-wheel, and a slide carried by said agitator.

5. In a fertilizer-distributer, a hopper, a rotary feed-wheel provided with pockets, and a chute-board adjustably arranged with relation to said feed-wheel to regulate the quantity of fertilizer to be distributed by each pocket, said chute-board being provided with a plurality of depressions into which the pockets are adapted to project during their rotation.

6. In a fertilizer-distributer, a hopper secured thereto, a rotary feed-wheel provided with pockets, a chute-board adjustably arranged with relation to the feed-wheel to regulate the quantity of fertilizer to be distributed by each pocket, means to adjust said chute-board, an agitator adapted to be vibrated by said feed-wheel, a slide mounted upon said agitator, and means for adjusting said slide.

In testimony whereof I affix my signature in presence of two witnesses.

PHILMA A. WHITLEY.

Witnesses:
B. E. HOWARD,
CALVIN WOODARD.